(12) United States Patent
Pan

(10) Patent No.: US 11,833,627 B2
(45) Date of Patent: Dec. 5, 2023

(54) PROJECTION-WELDING SPINNING TENSIONER AND MOLDING METHOD THEREOF

(71) Applicant: Zhejiang Dongxing Auto Parts CO., LTD, Zhejiang (CN)

(72) Inventor: Zhaoxing Pan, Zhejiang (CN)

(73) Assignee: Zhejiang Dongxing Auto Parts CO., LTD, Zhejiang (CN)

( * ) Notice: Subject to any disclaimer, the term of this patent is extended or adjusted under 35 U.S.C. 154(b) by 106 days.

(21) Appl. No.: 17/523,844

(22) Filed: Nov. 10, 2021

(65) Prior Publication Data

US 2023/0147935 A1    May 11, 2023

(51) Int. Cl.
| | | |
|---|---|---|
| *B23P 15/00* | (2006.01) | |
| *F16H 55/36* | (2006.01) | |
| *F16H 55/40* | (2006.01) | |
| *F16H 55/44* | (2006.01) | |

(52) U.S. Cl.
CPC .............. *B23P 15/00* (2013.01); *F16H 55/36* (2013.01); *F16H 55/40* (2013.01); *B23P 2700/50* (2013.01); *F16H 55/44* (2013.01)

(58) Field of Classification Search
CPC ...... B23P 15/00; B23P 2700/50; F16H 55/36; F16H 55/40; F16H 55/44
See application file for complete search history.

(56) References Cited

U.S. PATENT DOCUMENTS

| | | | |
|---|---|---|---|
| 7,645,204 B2* | 1/2010 | Swane | F16H 55/36 384/417 |
| 10,220,432 B2* | 3/2019 | Pan | B21D 22/14 |
| 2011/0045929 A1* | 2/2011 | Rolando | F16H 7/1218 474/112 |

* cited by examiner

*Primary Examiner* — Ryan J. Walters
(74) *Attorney, Agent, or Firm* — JCIP GLOBAL INC.

(57) ABSTRACT

A projection-welding spinning tensioner includes a first spoke and a second spoke. The first spoke includes a first rim end, a first plate end and a first center plate end. The second spoke includes a second rim end, a second plate end and a second center plate end. The first and second spokes have a same structure and are arranged in a mirror-symmetrical manner. Several projection-welding points are disposed on opposing surfaces of the first plate end and/or the second plate end, the projection-welding points are annularly arranged at an interval, the projection-welding points are arranged in a form of a concentric circle to form a least two annular arrangements, welded fixation of the first plate end and the second plate end is completed through the projection-welding points. A cavity groove for holding a bearing is formed inside after the first and second center plate ends are docked.

3 Claims, 5 Drawing Sheets

PROJECTION-WELDING SPINNING TENSIONER AND MOLDING METHOD THEREOF

BACKGROUND

Technical Field

The present invention relates to the technical field of automobile parts and in particular, relates to a projection-welding spinning tensioner and a molding method thereof.

Description of Related Art

A tensioner is a belt tensioning apparatus for an automobile transmission system and is capable of automatically adjusting a tensioning force according to different tensioning degrees of a belt to enable the transmission system stable, secure and reliable. The existing tensioner mostly consists of an upper half belt pulley, a lower half belt pulley and a bearing. In order to prevent the belt pulley from falling off in a high-speed running process, left and right belt pulleys are employed as a set and three holes are punched. A rivet is placed in a punched hole for a rivet connection.

The tensioner of the above structure has the following defects. 1) Firstly employing four working procedures: combining into a set, punching a hole, placing a rivet, and performing a rivet connection, resulting in excessively many working procedures for processing, long processing time and low production efficiency. 2) Firstly punching a hole on a belt pulley and placing a rivet upon in a punched hole for a rivet connection, resulting in high processing cost. 3) Rivets in the three punched holes on each tensioner need to be placed manually, which is easy cause operation fatigue to a worker.

SUMMARY

The objective of the present invention is to provide a projection-welding spinning tensioner for solving the above technical problem and a molding method thereof, optimizing a molding technique and realizing seamless welding of the tensioner for molding.

The technical problem to be solved in the present invention can be implemented with the following technical solution.

A projection-welding spinning tensioner includes a first spoke and a second spoke. The first spoke comprises a first rim end, a first plate end and a first center plate end. The second spoke comprises a second rim end, a second plate end and a second center plate end. The first spoke and the second spoke have a same structure, and the first spoke and the second spoke are arranged in a mirror-symmetrical manner. Several projection-welding points are disposed on opposing surfaces of the first plate end and/or the second plate end, the several projection-welding points are annularly arranged at an interval, and the several projection-welding points are arranged in a form of a concentric circle to form at least two annular arrangements. Welded fixation of the first plate end and the second plate end is completed through the projection-welding points, and a cavity groove for holding a bearing is formed inside after the first center plate end and the second center plate end are docked.

The several projection-welding points are arranged in a form of a concentric circle to form two annular arrangements, which are respectively a first girth welding point and a second girth welding point, and the number of the first girth welding point and the number of the second girth welding point are both 6.

The first girth welding point and the second girth welding point are arranged and disposed at radius lines of a same center upon being arranged.

A first through hole and a second through hole are respectively disposed on the first plate end and the second plate end, and the first through hole and the second through hole are disposed in correspondence with each other, to form a mutually penetrating through hole.

Both the first through hole and the second through hole are located between annular regions formed by the first girth welding point and the second girth welding point.

The first rim end comprises a first rim face and a first rim edge, the second rim end comprises a second rim face and a second rim edge, the first rim face and the second rim face are kept coaxial and laminating to each other, and the first rim edge and the second rim edge are of an outward-expanding structure.

The first center plate end comprises a first center plate body and a first center bordure, the second center plate end comprises a second center plate body and a second center bordure, and the first center bordure and the second center bordure are used to limit a bearing.

The first center bordure and the second center bordure have a length dimension of 2-4 mm.

Preferably, a deep groove ball bearing is employed as the bearing.

A molding method of the projection-welding spinning tensioner comprises the following steps.

Step 1) blanking: mounting a blanking die on a punching machine, and punching a steel plate to obtain a prefabricated workblank in a circular thin plate shape.

Step 2) piercing: mounting a piercing die on the punching machine, and punching a center inner hole at a center of the prefabricated workblank.

Step 3) side-reversing: mounting a side-reversing die on a hydraulic machine, initially molding an outer edge part of the prefabricated workblank, initially molding the edge part into an arc side-reversing structure, and performing side-reversing on a center site into a 90° straight-side structure, which is an axial vertical structure, thereby obtaining a first level semi-finished product.

Step 4) pressing a projection-welding point: pressing a corresponding projection-welding point on the first plate end and/or the second plate end through a projection welding machine, and protruding the projection-welding point downward with a surface concaved, thereby obtaining a second level semi-finished product.

Step 5) two-piece welding: selecting two pieces of the second level semi-finished products, arranging the second level semi-finished products in a mirror-symmetrical manner, making down-protruding positions of the projection-welding point correspondingly opposite to each other, and completing projection-welding, thereby obtaining a third level semi-finished product.

Step 6) spinning for molding: mounting a premolding spinning wheel and a molding spinning wheel respectively on corresponding spinning wheel stations on a spinning machine, driving the third level semi-finished product to rotate through rotation of a main shaft of the spinning machine, so as to enable a working surface of the premolding spinning wheel to contact and squeeze a rim end of the third level semi-finished product from the exterior to the interior, and to exit after a squeezing process reaches a threshold A, thereby forming a first rim end or a second rim end and obtaining a first level spinning blank; and enabling the working surface of the molding spinning wheel to contact and squeeze the rim end of the first level spinning blank from the exterior to the interior and to exit after a squeezing process reaches a threshold A, thereby forming a first rim edge or a second rim edge corresponding to a slope structure and obtaining a spinning semi-finished product.

Step 7) punching a small hole: mounting a small hole punching die on the punching machine, and punching the spinning semi-finished product to obtain a fourth level semi-finished product with a small hole of a prescribed diameter.

Step 8) secondary side-reversing: mounting a secondary side-reversing die on a small hydraulic machine, and performing side-reversing on an upper end or a lower end of a center site of the fourth level semi-finished product into a 90° straight-side structure, with a secondary side-reversing surface being a radial expansion structure.

Step 9) pressing a bearing: corresponding a bearing through a small hydraulic machine to an opening end of the center site which is not radially secondary side-reversed, so as to press the bearing into the cavity groove, thereby obtaining a fifth level semi-finished product.

Step 10) third side-reversing: mounting a third side-reversing die on a small hydraulic machine, performing side-reversing on an upper end or a lower end of a center site of the fifth level semi-finished product, i.e. another end surface which is not secondary side-reversed in step 8, into a 90° straight-side structure, with a third side-reversing surface being a radial expansion structure, and packaging the bearing in step 9 into the cavity groove to obtain a sixth level semi-finished product.

Step 11) painting: performing black electrophoretic painting processing on a surface of the sixth level semi-finished product to obtain a finished product.

Preferably, the projection-welding point in step 4) is in a 12-point arrangement.

Preferably, the 12 projection-welding points are arranged in two circular rings, there are 6 projection-welding points in a single circular ring and the 6 projection-welding points are arranged and disposed with an interval arc being 60°.

Compared with the prior art, the present invention has the following prominent advantages and effects: the present invention preferably employs a projection-welding manner to weld two thin plates together. Compared with the existing friction welding which employs a manner for welding a bearing seat with a thick steel plate, the present invention can effectively reduce the production cost, the overall weight of the product is lowered and the welding procedures are more convenient and effective, which facilitate processing. On the precondition of ensuring using performance of the product, lightweight production of the product can be realized.

The features of the present invention can be clearly understood by referring to drawings thereof and detailed descriptions of the following preferable embodiments.

DESCRIPTION OF THE EMBODIMENTS

In order to make the technical means, creative features, achievement goals and effects achieved by the present invention easy to understand, the present invention will be further described below in conjunction with specific illustrations.

Figure 1:
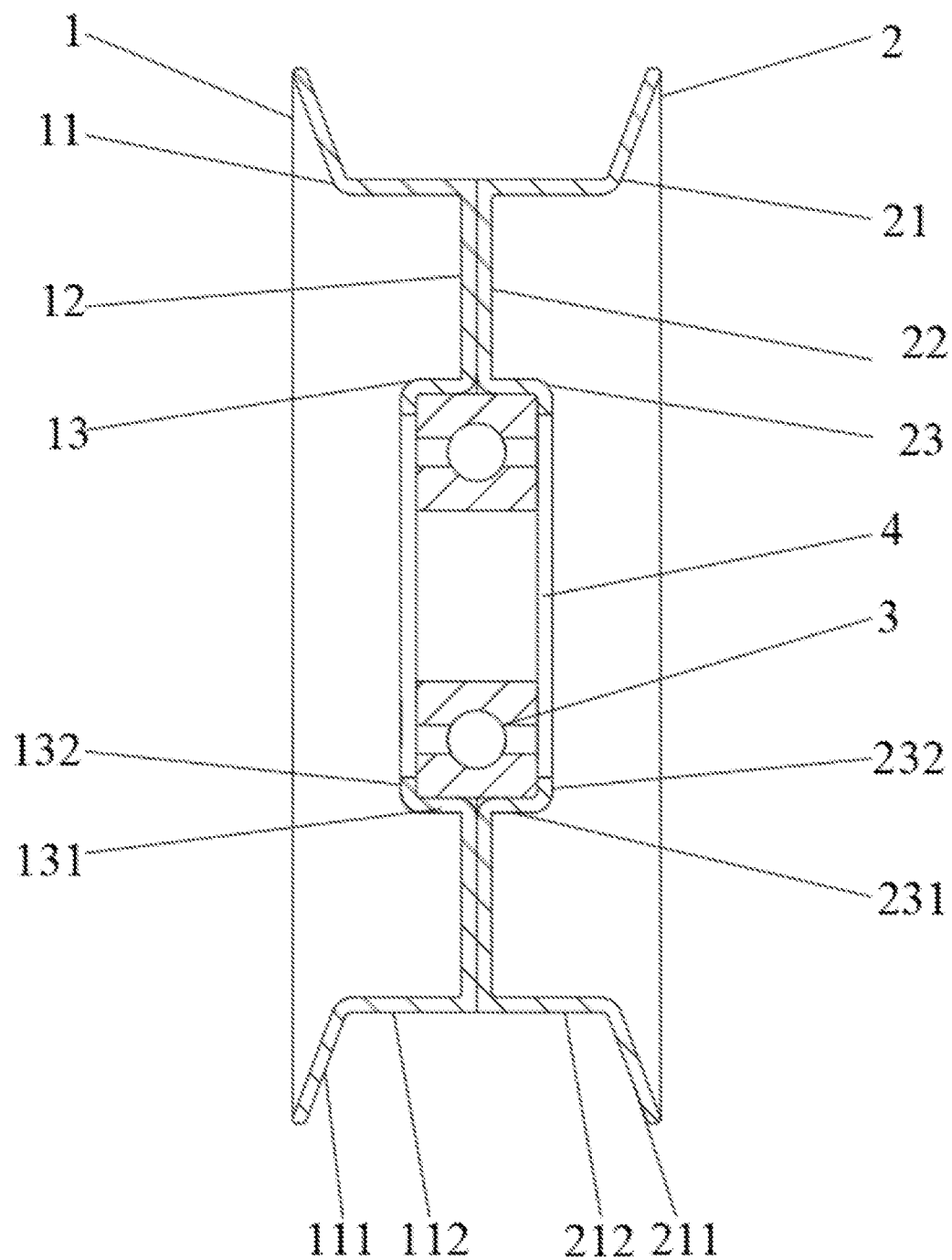
FIG. 1 is a structural diagram of an overall section view of the present invention.
Figure 2:
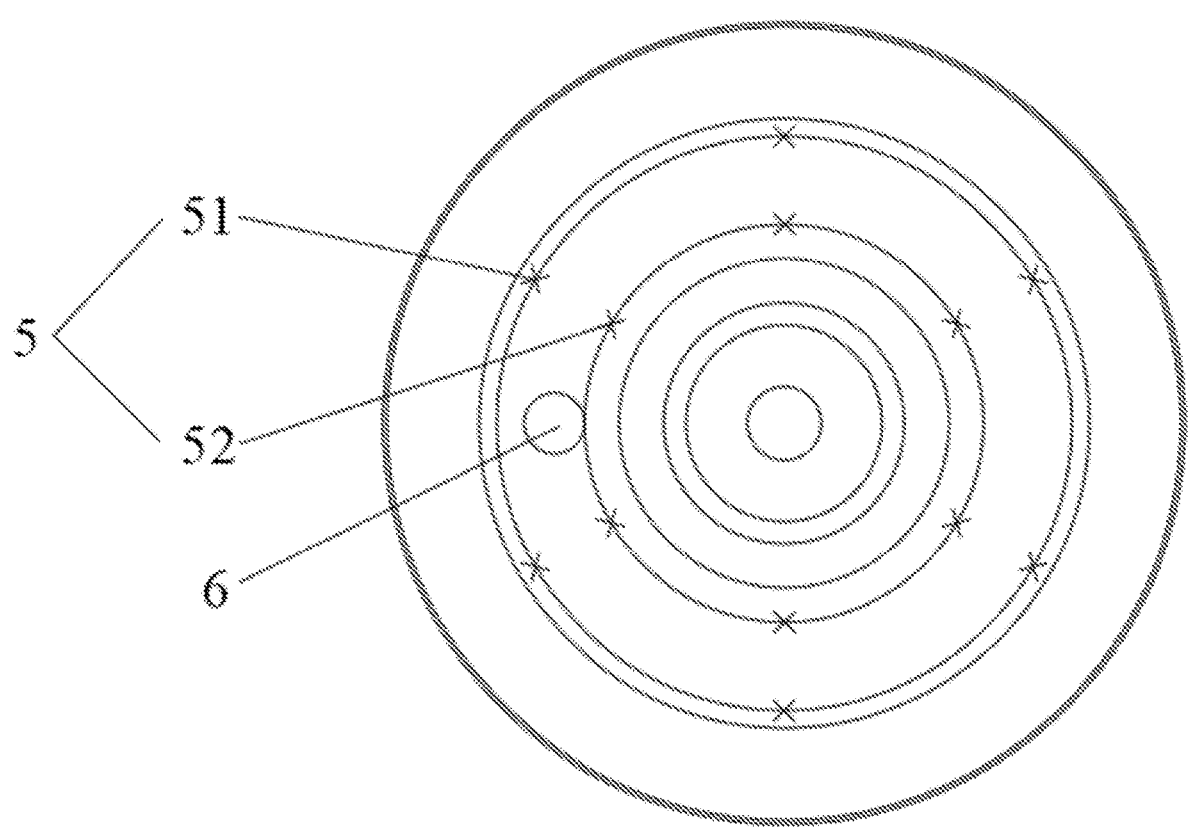
FIG. 2 is a top-view structural diagram a product of the present invention.
Figure 3:
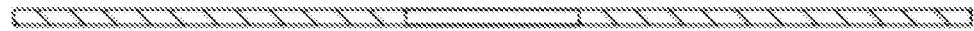
FIG. 3 is a schematic diagram of techniques for blanking and punching a hole in the present invention.
Figure 4:
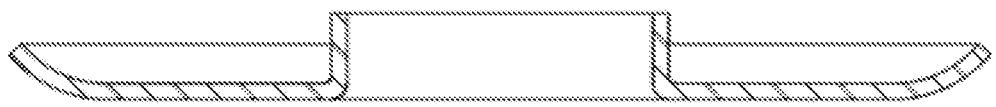
FIG. 4 is a schematic diagram of a side-reversing technique in the present invention.
Figure 5:
FIG. 5 is a schematic diagram of a technique for pressing a projection-welding point in the present invention.
Figure 6:
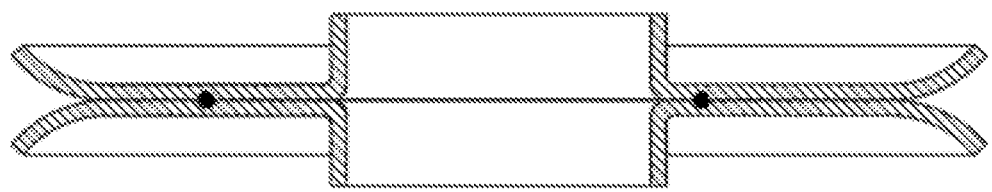
FIG. 6 is a schematic diagram of a two-piece welding technique in the present invention.
Figure 7:
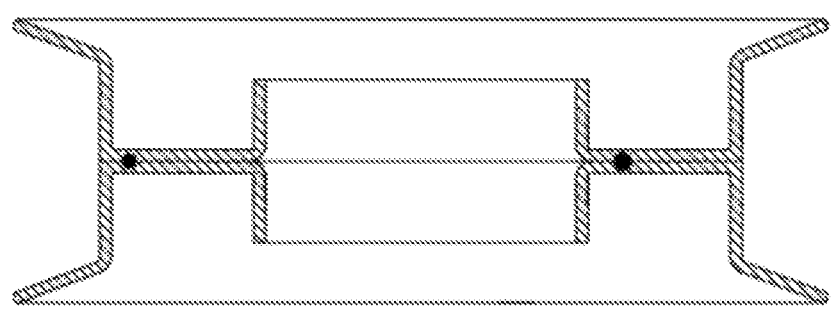
FIG. 7 is a schematic diagram of a spinning molding technique in the present invention.
Figure 8:
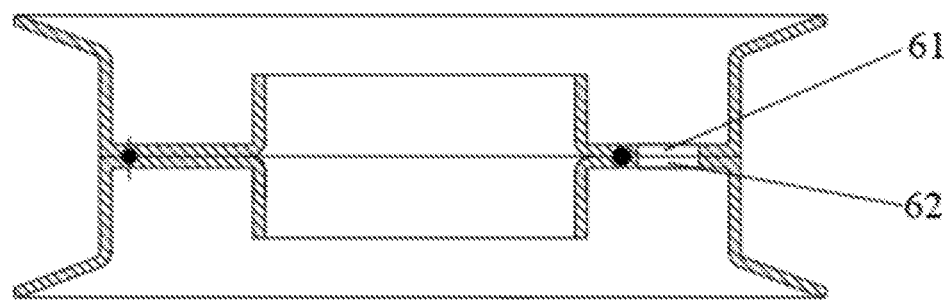
FIG. 8 is a schematic diagram of a technique for punching a hole in the present invention.
Figure 9:
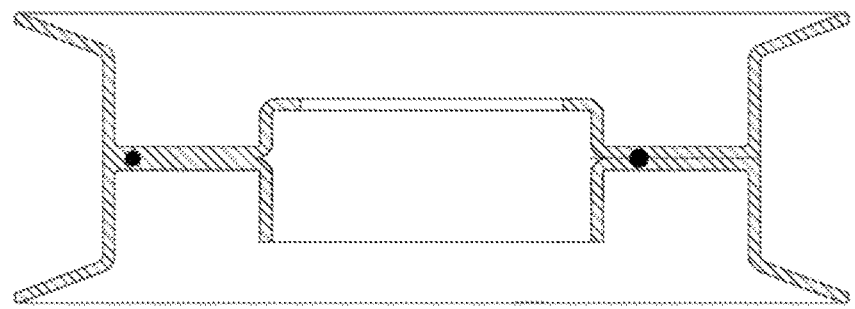
FIG. 9 is a schematic diagram of a secondary side-reversing technique in the present invention.
Figure 10:
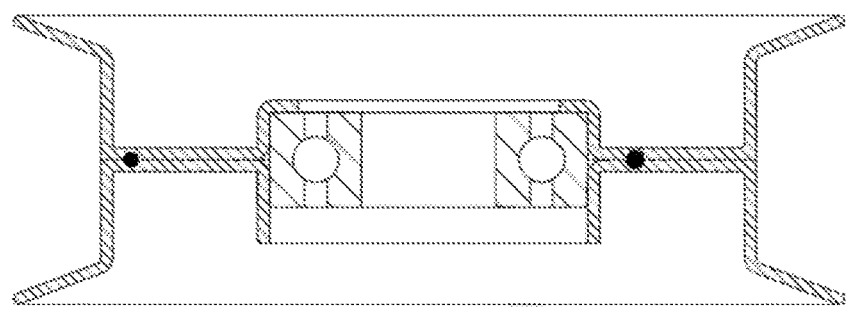
FIG. 10 is a schematic diagram of a technique for pressing a bearing in the present invention.
Figure 11:
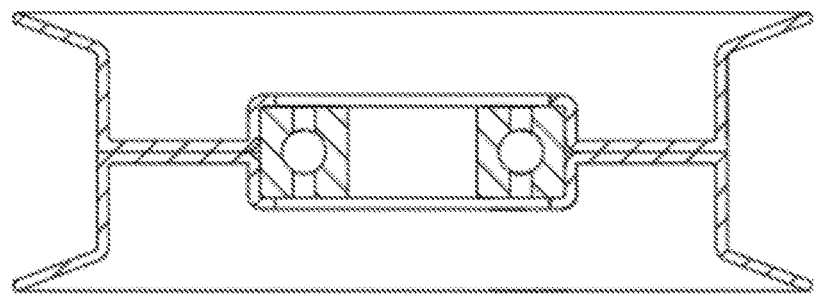
FIG. 11 is a schematic diagram of a third side-reversing technique in the present invention.

As shown in FIG. 1 to FIG. 11, the projection-welding spinning tensioner provided by the present invention comprises a first spoke 1 and a second spoke 2. The first spoke 1 comprises a first rim end 11, a first plate end 12 and a first center plate end 13, and the second spoke 2 comprises a second rim end 21, a second plate end 22 and a second center plate end 23. The first spoke 1 and the second spoke 2 have a same structure, and the first spoke 1 and the second spoke 2 are arranged in a mirror-symmetrical manner.

In the embodiment, preferably, several projection-welding points 5 are disposed on opposing surfaces of the first plate end 12 and/or the second plate end 22, the several projection-welding points 5 are annularly arranged at an interval, the several projection-welding points 5 are arranged in a form of a concentric circle to form at least two annular arrangements, and welded fixation of the first plate end 12 and the second plate end 22 is completed through the projection-welding points 5. A fixed structure for projection welding is employed to enable laminating of the first spoke 1 and the second spoke 2 to be relatively higher. In particular, in a long-term using process, loosening of a rivet connection in the prior art or an unevenness appearing to a rim part formed by the first rim end 11 and the second rim end 21 of a side part caused by displacement of the rivet connection, especially effect on evenness between the first rim face and the second rim face, is avoided. By optimizing the projection-welding structure employed, its fixation is made stable, such that the product can ensure flatness of the first rim face and the second rim face in a late-stage using process and meanwhile enable laminating degree of the first spoke and the second spoke closer to improve using performance of the product.

In one preferable embodiment thereof, the several projection-welding points 5 are arranged in a form of a concentric circle to form two annular arrangements, which are respectively a first girth welding point 51 and a second girth welding point 52, and the number of the first girth welding point 51 and the number of the second girth welding point 52 are both 6. The first girth welding point 51 and the second girth welding point 52 are arranged and disposed at radius lines of a same center upon being arranged. Optimizing the arrangement structure of the projection-welding points 5 is used for improving welding stability and symmetry of the first spoke 1 and the second spoke 2.

Preferably, a cavity groove 4 for holding a bearing 3 is formed inside after the first center plate end 13 and the second center plate end 23 are docked. Preferably, a deep groove ball bearing is employed as the bearing 3 for mounting a matching shaft.

In one preferable embodiment thereof, a first through hole 61 and a second through hole 62 are respectively disposed on the first plate end 11 and the second plate end 21, and the first through hole 61 and the second through hole 62 are disposed in correspondence with each other, to form a mutually penetrating through hole 6. Both the first through hole 61 and the second through hole 62 are located between annular regions formed by the first girth welding point 51 and the second girth welding point 52. A through hole structure is used for fit with a fastener for realizing secondary fastening.

In one preferable embodiment thereof, the first rim end 11 comprises a first rim face 112 and a first rim edge 111, the second rim end 21 comprises a second rim face 212 and a second rim edge 211, the first rim face 112 and the second rim face 212 are kept coaxial and laminating to each other, and the first rim edge 111 and the second rim edge 211 are of an outward-expanding structure.

In one preferable embodiment thereof, the first center plate end 13 comprises a first center plate body 131 and a first center bordure 132, the second center plate end 23 comprises a second center plate body 231 and a second center bordure 232, and the first center bordure 132 and the second center bordure 232 are used to limit a bearing 3, thereby improving stability upon being mounted inside the bearing 3, to enable integrity of the product more excellent.

In one preferable embodiment thereof, the first center bordure 132 and the second center bordure 232 have a length dimension of 2-4 mm, which is generally not greater than a thickness dimension of an outer circle of the bearing.

Wherein, a molding method of the projection-welding spinning tensioner comprises the following steps.

Step 1) blanking: mounting a blanking die on a punching machine, and punching a steel plate to obtain a prefabricated workblank in a circular thin plate shape.

Step 2) piercing: mounting a piercing die on the punching machine, and punching a center inner hole at a center of the prefabricated workblank.

Step 3) side-reversing: mounting a side-reversing die on a hydraulic machine, initially molding an outer edge part of the prefabricated workblank, initially molding the edge part into an arc side-reversing structure, and performing side-reversing on a center site into a 90° straight-side structure, which is an axial vertical structure, thereby obtaining a first level semi-finished product.

Step 4) pressing a projection-welding point: pressing a corresponding projection-welding point on the first plate end and/or the second plate end through a projection welding machine, and protruding the projection-welding point downward with a surface concaved, thereby obtaining a second level semi-finished product; wherein the projection-welding point is in a 12-point arrangement, the 12 projection-welding points are arranged in two circular rings, there are 6 projection-welding points in a single circular ring and the 6 projection-welding points are arranged and disposed with an interval arc being 60°.

Step 5) two-piece welding: selecting two pieces of the second level semi-finished products, arranging the second level semi-finished products in a mirror-symmetrical manner, making down-protruding positions of the projection-welding point correspondingly opposite to each other, and completing projection-welding, thereby obtaining a third level semi-finished product.

Step 6) spinning for molding: mounting a premolding spinning wheel and a molding spinning wheel respectively on corresponding spinning wheel stations on a spinning machine, driving the third level semi-finished product to rotate through rotation of a main shaft of the spinning machine, so as to enable a working surface of the premolding spinning wheel to contact and squeeze a rim end of the third level semi-finished product from the exterior to the interior, and to exit after a squeezing process reaches a threshold A, thereby forming a first rim end or a second rim end and obtaining a first level spinning blank; and enabling the working surface of the molding spinning wheel to contact and squeeze the rim end of the first level spinning blank from the exterior to the interior and to exit after a squeezing process reaches a threshold A, thereby forming a first rim edge or a second rim edge corresponding to a slope structure and obtaining a spinning semi-finished product.

Step 7) punching a small hole: mounting a small hole punching die on the punching machine, and punching the spinning semi-finished product to obtain a fourth level semi-finished product with a small hole of a prescribed diameter.

Step 8) secondary side-reversing: mounting a secondary side-reversing die on a small hydraulic machine, and performing side-reversing on an upper end or a lower end of a center site of the fourth level semi-finished product into a 90° straight-side structure, with a secondary side-reversing surface being a radial expansion structure.

Step 9) pressing a bearing: corresponding a bearing through a small hydraulic machine to an opening end of the center site which is not radially secondary side-reversed, so as to press the bearing into the cavity groove, thereby obtaining a fifth level semi-finished product.

Step 10) third side-reversing: mounting a third side-reversing die on a small hydraulic machine, performing side-reversing on an upper end or a lower end of a center site of the fifth level semi-finished product, i.e. another end surface which is not secondary side-reversed in step 8, into a 90° straight-side structure, with a third side-reversing surface being a radial expansion structure, and packaging the bearing in step 9 into the cavity groove to obtain a sixth level semi-finished product.

Step 11) painting: performing black electrophoretic painting processing on a surface of the sixth level semi-finished product to obtain a finished product.

Wherein, the technical parameters of the specific product are combined, and the preferable embodiment is shown as follows.

As shown in FIG. 3 to FIG. 8, the steps are described in the following. Step 1) blanking: mounting a blanking die on a punching machine, and punching a stainless steel plate to obtain a prefabricated workblank in a circular thin plate shape with a diameter L1 at 122 mm. Step 2) piercing: mounting a piercing die on the punching machine, and punching a center inner hole with a diameter L2 at 22 mm at a center of the prefabricated workblank. Step 3) side-reversing: mounting a side-reversing die on a hydraulic machine, initially molding an outer edge part of the prefabricated workblank, initially molding the edge part into an arc side-reversing structure, and performing side-reversing on a center site into a 90° straight-side structure, which is an axial vertical structure, thereby obtaining a first level semi-finished product. A horizontal distance between two straight-side structures L3 is 40 mm, a vertical height of a straight side L4 is 9 mm, a height of a side-reversing structure L5 is 5 mm and a radius of a side-reversing curved side L6 is 15 mm. Step 4) pressing a projection-welding point: pressing a corresponding projection-welding point on the first plate end and/or the second plate end through a projection welding machine, and protruding the projection-welding point downward with a surface concaved, thereby obtaining a second level semi-finished product. Step 5) two-piece welding: selecting two pieces of the second level semi-finished products, arranging the second level semi-finished products in a mirror-symmetrical manner, making down-protruding positions of the projection-welding point correspondingly opposite to each other, and completing 12-point projection-welding, thereby obtaining a third level semi-finished product. Step 6) spinning for molding: mounting a premolding spinning wheel and a molding spinning wheel respectively on corresponding spinning wheel stations on a spinning machine, driving the third level semi-finished product to rotate through rotation of a main shaft of the spinning machine, so as to enable a working surface of the premolding spinning wheel to contact and squeeze a rim end of the third level semi-finished product from the exterior to the interior, wherein the rim end is the first rim end or/and the second rim end and to exit after a squeezing process reaches a threshold A, thereby forming an upper rim face end and obtaining a first level spinning blank; and enabling the working surface of the molding spinning wheel to contact and squeeze the rim end of the first level spinning blank from the exterior to the interior and to exit after a squeezing process reaches a threshold A, thereby forming an upper rim extending end corresponding to a slope structure and obtaining a spinning semi-finished product. Step 7) punching a small hole: mounting a small hole punching die on the punching machine, and punching the spinning semi-finished product to obtain a fourth level semi-finished product with a small hole of a prescribed diameter L7 at 7.92±0.25 mm. Step 8) secondary side-reversing: mounting a secondary side-reversing die on a small hydraulic machine, and performing side-reversing on an upper end or a lower end of a center site of the fourth level semi-finished product into a 90° straight-side structure, with a secondary side-reversing surface being a radial expansion structure. An inner hole formed by side-reversing has a diameter L8 at 33 mm. Step 9) pressing a bearing: corresponding a bearing through a small hydraulic machine to an opening end of the center site which is not radially secondary side-reversed, so as to press the bearing into the cavity groove, thereby obtaining a fifth level semi-finished product. Step 10) third side-reversing: mounting a third side-reversing die on a small hydraulic machine, performing side-reversing on an upper end or a lower end of a center site of the fifth level semi-finished product, i.e. another end surface which is not secondary side-reversed in step 8, into a 90° straight-side structure, with a third side-reversing surface being a radial expansion structure, and packaging the bearing in step 9 into the cavity groove to obtain a sixth level semi-finished product. Step 11) painting: performing black electrophoretic painting processing on a surface of the sixth level semi-finished product to obtain a finished product.

Each parameter in the above embodiments has a parameter error value, as a specific parameter value is not limited. There are also other parameter values according to the using situation of the product structure.

The present invention preferably employs a projection-welding manner to weld two thin plates together. Compared with the existing friction welding which employs a manner for welding a bearing seat with a thick steel plate, the present invention can effectively reduce the production cost, the overall weight of the product is lowered and the welding procedures are more convenient and effective, which facilitate processing. On the precondition of ensuring using performance of the product, lightweight production of the product can be realized.

It can be known from the common technical knowledge that the present invention can be implemented by other embodiments which are not separated from spiritual essence or necessary features of the present invention. Therefore, the above-disclosed embodiments are merely illustrative and not exclusive in all respects. All changes which are within the scope of the present invention or equivalent to the scope of the present invention are encompassed by the present invention.

What is claimed is:

1. A molding method of a projection-welding spinning tensioner, the molding method comprising the following steps:

step 1: blanking, including mounting a blanking die on a punching machine, and punching a steel plate to obtain a prefabricated workblank in a circular thin plate shape;

step 2: piercing, including mounting a piercing die on the punching machine, and punching a center inner hole at a center of the prefabricated workblank;

step 3: side-reversing, including mounting a side-reversing die on a hydraulic machine, initially molding an outer edge part of the prefabricated workblank, initially molding the outer edge part into an arc side-reversing structure, and performing side-reversing on a center site into a 90° straight-side structure, which is an axial vertical structure, and obtaining a first level semi-finished product;

step 4: pressing a projection-welding point, including pressing a corresponding projection-welding point on the first plate end and/or the second plate end through a projection welding machine, and protruding the projection-welding point downward with a surface concaved, and obtaining a second level semi-finished product;

step 5: two-piece welding, including selecting two pieces of the second level semi-finished products, arranging the second level semi-finished products in a mirror-symmetrical manner, making down-protruding positions of the projection-welding point correspondingly opposite to each other, and completing projection-welding, and obtaining a third level semi-finished product;

step 6: spinning for molding, including mounting a premolding spinning wheel and a molding spinning wheel respectively on corresponding spinning wheel stations on a spinning machine, driving the third level semi-finished product to rotate through rotation of a main shaft of the spinning machine, so as to enable a working surface of the premolding spinning wheel to contact and squeeze a rim end of the third level semi-finished product from an exterior to an interior, and to exit after a squeezing process reaches a threshold, and forming a first rim end or a second rim end and obtaining a first level spinning blank; and enabling a working surface of the molding spinning wheel to contact and squeeze a rim end of the first level spinning blank from an exterior to an interior and to exit after a squeezing process reaches the threshold, forming a first rim edge or a second rim edge corresponding to a slope structure, and obtaining a spinning semi-finished product;

step 7: punching a small hole, including mounting a small hole punching die on the punching machine, and punching the spinning semi-finished product to obtain a fourth level semi-finished product with a small hole of a prescribed diameter;

step 8: secondary side-reversing, including mounting a secondary side-reversing die on a small hydraulic machine, and performing side-reversing on one of an upper end and a lower end of a center site of the fourth level semi-finished product into a 90° straight-side structure, with a secondary side-reversing surface being a radial expansion structure;

step 9: pressing a bearing, including corresponding the bearing through the small hydraulic machine to an opening end of the center site which is not radially secondary side-reversed, so as to press the bearing into a cavity groove, and obtaining a fifth level semi-finished product;

step 10: third side-reversing, including mounting a third side-reversing die on the small hydraulic machine, performing side-reversing on another one of the upper end and the lower end, which is not secondary side-reversed in step 8, of a center site of the fifth level semi-finished product into a 90° straight-side structure, with a third side-reversing surface being a radial expansion structure, and packaging the bearing in the step 9 into the cavity groove to obtain a sixth level semi-finished product; and step 11: painting, including performing black electrophoretic painting processing on a surface of the sixth level semi-finished product to obtain a finished product.

2. The molding method of the projection-welding spinning tensioner according to claim 1, wherein the projection-welding point in the step 4 is in a 12-point arrangement.

3. The molding method of the projection-welding spinning tensioner according to claim 2, wherein the 12 projection-welding points are arranged in two circular rings, 6 projection-welding points are provided in each circular ring and the 6 projection-welding points are arranged and disposed with an interval arc being 60°.

* * * * *